United States Patent [19]

Scholz et al.

[11] Patent Number: 4,822,665

[45] Date of Patent: Apr. 18, 1989

[54] PHOTOPOLYMERIZABLE MOLDING MATERIALS CONTAINING METAL WIRE INSERTS

[75] Inventors: Dankmar Scholz; Klaus Liebe, both of Frankenthal, Fed. Rep. of Germany

[73] Assignee: BASF Aktiengesellschaft, Ludwigshafen, Fed. Rep. of Germany

[21] Appl. No.: 17,089

[22] Filed: Feb. 20, 1987

[51] Int. Cl.$^4$ .......................... B29D 7/02; H05B 1/00
[52] U.S. Cl. ...................................... 428/222; 264/22; 264/213; 428/240; 428/252; 428/256; 428/260; 428/283; 428/285; 428/290; 428/294; 428/458; 428/480; 428/913; 428/34.5; 428/35.8

[58] Field of Search ................. 428/36, 222, 240, 252, 428/256, 260, 283, 285, 290, 294, 458, 480, 913; 264/22, 213; 156/275.5; 427/54.1

[56] References Cited

U.S. PATENT DOCUMENTS 4,425,287  1/1984  Hesse et al. .......................... 428/913

*Primary Examiner*—Marion C. McCamish
*Attorney, Agent, or Firm*—Keil & Weinkauf

[57] ABSTRACT

The invention relates to photopolymerizable, sheet-like molding materials containing a mixture of an unsaturated polyester, monomers, a thickener, pulverulent and/or fibrous additives and metal wire inserts. The molding materials can be shaped, for example by pressing or deep-drawing, to give dimensionally staple semifinished products which are cured to give finished articles. The latter can be employed as automotive components or domestic appliance components.

6 Claims, No Drawings

PHOTOPOLYMERIZABLE MOLDING MATERIALS CONTAINING METAL WIRE INSERTS

The present invention relates to photopolymerizable, sheet-like molding materials based on unsaturated polyester resins containing metal wire inserts, and to a process for the production of moldings by curing the molding materials.

EP-A-No. 23 634 (U.S. Pat. No.-A-4 425 287) describes a process for the manufacture of moldings from unsaturated polyester resins. In this, a mixture of an unsaturated polyester, monomers, a photoinitiator, a thickener and pulverulent and/or fibrous additives is produced. The mixture is thickened to form a semi-finished product, and the latter is shaped and finally cured by irradiation with ultraviolet. If the semi-finished product is stamped, pressed or deepdrawn in a mold, the curing by irradiation must be carried out in the mold, necessitating a relatively long residence time in the mold. If attempts are made to remove the thickened, shaped semi-finished product from the mold in order to cure it in a separate irradiation step, it is found that the product is not dimensionally stable and instead, because of its high recovery forces, loses its shape even if it has a very high content of thickener or reinforcing materials.

It is an object of the present invention to modify the known process so that the recovery forces of the thickened, shaped semi-finished product are substantially annulled and accordingly the product no longer loses its shape after having been taken from the mold. It is a further object of the invention to reduce the cycle times for deep-drawing and pressing of the semi-finished product, so that long runs of moldings of reinforced polyester resins can be produced economically.

It is known that metal wires and metal grids may be inserted into molding materials of unsaturated polyester resins or into sheet-like semi-finished products of reinforced polyester resins (SMC compositions) in order to increase the stability of the cured molding or to render it electrically conductive. Such resin compositions or SMC compositions are cured thermally, so that here again a long residence time in the heated mold is required.

We have found that the above objects are achieved if metal wires are inserted into the photocurable semifinished products.

Accordingly, the invention relates to a photopolymerizable, sheet-like molding material which contains
1. an unsaturated polyester with or without
2. a copolymerizable vinyl compound,
3. 0.005–0.5% by weight of an inhibitor,
4. 0.01–3% by weight of a photoinitiator,
5. 0.2–5% by weight of a thickening oxide or hydroxide of lithium, magnesium or calcium or of a metal alcoholate or of an isocyanate,
6. 1–50% by weight of an ultraviolet-transmitting pulverulent assistant and/or
7. 5–70% by weight of a fibrous reinforcing material, with or without
8. other conventional additives, the percentages being based on the mixture, and 10 to 500 parts by weight of metal wire per 100 parts by weight of the said mixture.

The invention further relates to a process for the production of moldings, in which the above mixture is thickened to form a semi-finished product and the latter is shaped and cured, metal wires being inserted into the mixture before or after thickening.

The following should be noted concerning the starting components 1 to 8.

1. Suitable unsaturated polyesters are the conventional condensates of polybasic, especially dibasic, carboxylic acids and their esterifiable derivatives, especially their anhydrides, which are linked by ester bonds to polyhydric, especially dihydric alcohols, which condensates may or may not additionally contain radicals of monobasic carboxylic acids, monohydric alcohols or hydroxycarboxylic acids, with at least some of the radicals present possessing ethylenically unsaturated co-polymerizable groups.

Suitable polyhydric, especially dihydric, saturated or unsaturated alcohols are the conventional alkanediols and oxaalkanediols in particular containing acyclic groups, cyclic groups of both types of groups, for example ethylene glycol, 1,2-propanediol, 1,3-propanediol, 1,3-butanediol, 1,4-butanediol, 1,6-hexanediol, 2,2-dimethyl-1,3-propanediol, diethylene glycol, triethylene glycol, polyethylene glycol, cyclohexane-1,2-diol, 2,2-bis-(p-hydroxycyclohexyl)-propane, trimethylpropanol monoallyl ether and 1,4-butenediol. Further, minor amounts of monohydric, trihydric or polyhydric alcohols, for example ethylhexanol, fatty alcohols, benzyl alcohols, 1,2-di- (allyloxy)-propan-3-ol, glycerol, pentaerythritol or trimethylolpropane may be used additionally, in minor amounts. The polyhydric, especially dihydric, alcohols are in general reacted in stoichiometric or approximately stoichiometric amounts with polybasic, especially dibasic, carboxylic acids or their condensenable derivatives.

Suitable carboxylic acids or their derivatives are dibasic olefinically unsaturated, preferably $\alpha,\beta$-olefinically unsaturated, carboxylic acids, e.g. maleic acid, fumaric acid, chloromaleic acid, itaconic acid, citraconic acid, methylene-glutaric acid and mesaconic acid or their esters or, preferably, their anhydrides. In addition, the polyesters may contain, as co-condensed units, other, modifying, dibasic, unsaturated and/or saturated as well as aromatic carboxylic acids and anhydrides, e.g. succinic acid, glutaric acid, $\alpha$-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid, endomethylenetetrachlorophthalic acid or hexachloroendomethylenetetrahydrophthalic acid, as well as monobasic, tribasic and polybasic carboxylic acids, eg. ethylhexanoic acid, fatty acids, methacrylic acid, propionic acid, benzoic acid, 1,2,5-benzenetricarboxylic acid or 1,2,4,5-benzenetetracarboxylic acid. Maleic acid, maleic anhydride and fumaric acid are preferred.

The molar ratio of unsaturated to saturated dicarboxylic acids is preferably from 1:0 to 1:2.5.

Mixtures of unsaturated polyesters, also including those which have only limited solubility in vinyl monomers and crystallize readily may also be employed with advantage. Such readily crystallizing unsaturated polyesters may, for example, be synthesized from fumaric acid, adipic acid, terephthalic acid, ethylene glycol, 1,4-butanediol, 1,6-hexanediol and neopentylglycol.

Unsaturated polyesters, preferably with terminal double bonds, are also suitable.

The unsaturated polyesters have acid numbers of from 10 to 100, preferably from 20 to 60, and mean molecular weights of about 800–6,000, preferably about 1,000–4,000.

The amorphous unsaturated polyesters, which may or may not be crystallizable, are in general prepared from their starting components by melt condensation or condensation under azeotropic conditions at from 150° to 220° C., using continuous or batchwise processes.

Concerning the composition of unsaturated polyesters, reference may be made, for example, to the book by H. V. Boenig, Unsaturated Polyesters: Structure and Properties, Amsterdam, 1964. The mixture in general contains from 10 to 80, preferably from 15 to 70, % by weight of unsaturated polyester.

Vinyl ester resins may also be employed. These are esterification products of epoxy resins, preferably of resins based on bisphenol A or ethoxylated bisphenol A, with methacrylic acid. They possess terminal polymerizable vinyl groups. To allow them to be thickened with metal oxides, their lateral hydroxyl groups may be esterified with dicarboxylic acids or their anhyrides. This results in lateral carboxyl groups, which are required for the thickening reaction. In a particular embodiment, vinyl ester resins are employed free from monomers.

2. Suitable copolymerizable, ethylenically unsaturated monomeric compounds are the allyl compounds and, preferably, vinyl compounds conventionally used to prepare unsaturated polyester molding materials, such as styrene, substituted styrenes, e.g. p-chlorostyrene or vinyltoluene, esters of acrylic acid and methacrylic acid with alcohols of 1 to 18 carbon atoms, such as methyl methacrylate, butyl acrylate, ethylhexyl acrylate, hydroxypropyl acrylate, dihydroxydicyclopentadienyl acrylate and butanediol diacrylate, acrylamide, methacrylamide, allyl esters, such as diallyl phthalate, and vinyl esters, such as vinyl ethylhexanoate, vinyl pivalate and others. Mixtures of the said olefinically unsaturated monomers may also be used. Styrene, α-methylstyrene, chlorostyrene, vinyltoluene, divinylbenzene and diallyl phthalate are particularly suitable as component 2. Component 2 is generally present in the mixture in an amount of from 20 to 80, preferably from 25 to 75, % by weight.

3. The photocurable molding materials are stabilized with conventional inhibitors. Examples include phenolic inhibitors, such as hydroquinone, substituted hydroquinone, pyrocatechol, tert.-butylpyrocatechol and nuclear-substituted pyrocatechol derivatives, quinones, such as benzoquinone, naphthaquinone and chloranil, nitrobenzenes, such as m-dinitrobenzene, thiodiphenylamine, N-nitroso compounds, such as N-nitrosodiphenylamine and salts of N-nitroso-N-cyclohexylhydroxylamine, and mixtures of these. As additional stabilizers, there may also be used salts of divalent copper, for example copper naphthenate or copper octanoate, and quaternary ammonium salts of structure $NR^5R^6,R^7,R^8+x-$ where $R^5$, $R^6$, $R^7$ and $R^8$ are alkyl of 7 to 30 carbon atoms and x is halogen, preferably chlorine.

The addition of selected ultraviolet absorbers to achieve light stabilization of the cured products in some cases slightly reduces the ultraviolet curing speed, but this reduction may be acceptable. Suitable ultraviolet absorbers are products of the hydroxybenzophenone, salicylic acid ester and hydroxyphenylbenztriazole categories.

The inhibitors are present in the mixture in an amount of from 0.005 to 0.5, preferably from 0.01 to 0.2, by weight.

4. Suitable photoinitiators are those which form free radicals when activated by light of wavelengths from 300 to 600 nm. Examples include benzil ketals, e.g. benzil dimethyl ketal, benzil diethyl ketal, benzil dipropyl ketal, benzil methylallyl ketal, benzil methylbenzyl ketal, benzil ethylene ketal and benzil neopentylene ketal, benzoin ethers, e.g. benzoin isobutyl ether, benzoin methyl ether, benzoin ethyl ether, benzoin isopropyl ether and methylolbenzoin methyl ether, alkylbenzoin ethers, benzil in combination with aliphatic amines (e.g. methyldiethanolamine), acylphosphine oxides, e.g. pivaloyldiphenylphosphine oxide, p-toluyl-diphenylphosphine oxide, 2,6-trimethoxybenzoyl-diphenylphosphine oxide, 2,6-dichlorobenzoyl-diphenylphosphine oxide, 2,6-dimethylbenzoyl-diphenylphosphine oxide and 2,3,5,6-tetramethylbenzoyl-diphenylphosphine oxide, 2,2-diethoxy-acetophenone, 2-naphthalenesulfonyl chloride, 1-butyl-2-naphthalenesulfonyl chloride, 1-chloromethylnaphthalene and 1,4-dibutyl-2-naphthalenesulfonyl chloride, and disulfides, such as diphenyl disulfide, p,p-ditolyl disulfide and β,β-dinaphthyl disulfide.

The photoinitiators are employed in concentrations of from 0.01 to 3% by weight, preferably from 0.1 to 1% by weight and mixtures of the initiators may also be used.

5. The thickeners used are oxides or hydroxides of lithium, magnesium or calcium, as well as metal alcoholates, e.g. of magnesium, calcium, aluminum or titanium. Magnesium oxide is preferred. Isocyanates may also be used. These are especially employed with vinyl ester resins which do not contain any carboxyl groups. Diphenylmethane diisocyanate and toluylene diisocyanate prepolymers are preferred. The thickeners are employed in amounts of from 0.2 to 5, preferably from 0.5 to 2.0, % by weight based on the mixture.

6. The pulverulent fillers must transmit ultraviolet light so that curing is complete even in deeper layers. Examples of suitable fillers are hydrated aluminum oxide, glass powder, quartz powder, quartz sand, glass beads, barium sulfate, talc and highly disperse silica. The mixture may contain from 1 to 50% by weight of the pulverulent fillers.

7. Suitable reinforcing materials are inorganic or organic fibers, or sheet-like structures thereof (which may or may not be woven), such as mats, woven fabrics, laid fabrics and rovings, for example of glass, asbestos, cellulose and synthetic organic high molecular weight polymers, such as nylon, polyethylene, polypropylene, polyacrylonitrile and polyesters, for example polyethylene terephthalate.

The reinforcing materials may be present in the mixture in amounts of from 5 to 70% by weight. Combining pulverulent fillers with fibrous reinforcing materials proves advantageous in many cases.

8. Examples of other possible additives are lubricants, such as metal stearate, especially magnesium and calcium stearate, or polyethylene wax. When used in amounts of from 1 to 8% by weight, based on the mixture, they reduce the tackiness of the semi-finished product.

In addition to the thickeners (component 5), 0.05–2% by weight of thickening accelerator may be incorporated into the mixture. Suitable thickening accelerators are ammonium chlorides (trimethylbenzylammonium chloride, trimethylcyclohexylammonium chloride or choline chloride), phosphonium chlorides (for example triphenylmethylphosphonium chloride) and sulfonium halides. Further thickening accelerators which may be used are water (in amounts of from 0.1 to 0.5% by weight) and polyols (ethylene glycol or 1,2-propanediol in amounts of from 0.2 to 2% by weight).

To reduce monomer evaporation and form a non-tacky surface, the mixtures may contain from 0.01 to 5% by weight, preferably from 0.1 to 0.5% by weight, of paraffins, those of melting point from 25° to 90° C., especially from 45° to 60° C., being preferred. Instead of the paraffins, other waxy substances, for example the paraffin oxidation products known as montan wax and their esters, long-chain fatty acids, such as stearic acid, stearyl stearate and the like may be employed.

As initiators additional to the photoinitiators, there may be added to the mixture from 0.05 to 2.0% by weight of compounds which form free radicals by thermal decomposition, for example peresters, e.g. tert.-butyl peroctanoate and tert.-butyl perpivalate, percarbonates, e.g. bis-4-tert.-butylcyclohexyl peroxydicarbonate, diacyl peroxides, e.g. benzoyl peroxide, dialkyl peroxide, e.g. di-tert.-butyl peroxide and dicumyl peroxide, azo compounds, e.g. azodiisobutyronitrile and C-C-labile compounds, e.g. tetraphenylsuccinodinitrile, tetraphenylethanediol or tetrasubstituted dibenzyl compounds.

Finally, from 1 to 20% by weight of shrinkage-reducing additives, for example thermoplastic polymers, e.g. polystyrene, styrene copolymers, polyvinyl acetates or polymethacrylates, may also be added.

According to the invention, the photopolymerizable sheet-like molding materials contain from 10 to 500, preferably from 50 to 200, parts by weight of metal wire per 100 parts by weight of the mixture of components 1 to 8. The number and thickness of the wires depends on the recovery force of the semi-finished product. The greater this force, the more numerous or thicker the wires which have to be inserted into the semi-finished product so that the latter, after shaping, retains the shape which has been imparted to it. The wire thickness can vary within wide limits, namely from 0.1 tb 3 mm, preferably from 0.2 to 2 mm.

The metal wire may be present in the molding material either unidimensionally in the form of substantially parallel wires, or in the form of a helix. In the latter case, the sheet-like molding material is in fact in the shape of a tube in which the unidimensional wire has been embedded as a spiral.

Preferably, however, the wire is present in the molding material in a two-dimensional arrangement, namely in the form of a laid web or braid or grid. In the wire grid the individual wires may - as in a sieve - be woven or be placed loosely together and then welded together. However, it is also possible to use laid wire webs which have not been welded, in which case the individual wires are fixed in position by the plastics matrix.

The preferred material for the wires is steel or iron. However, for special purposes wires of aluminum, copper, alloy steels or other metals may also be used.

In producing moldings from the molding materials, the components 1 to 6 and 8, described above, are first mixed homogeneously. This may be done in open vessels, for example by vigorous stirring. If fibrous reinforcing materials (component 7) in the form of mats, woven fabrics, laid fabrics, rovings or nonwovens are employed, it is advantageous to impregnate these with the liquid mixture of the other components.

In most cases, especially in the production of fiber-reinforced moldings, it is advantageous to apply the liquid mixture to a carrier material. Examples of suitable carrier materials are plastics films, especially polyester, polyvinyl alcohol or cellulose ester films, coated papers or thin layers (preferably 0.05 to 1 mm thick) of cured unsaturated polyester resins or thermoplastics. It is often also advantageous to cover the applied layer of the mixture with a film of the same material. This prevents evaporation of monomer, and the film serves as a release layer from the shaping tool. The curable mixture is in general present on the carrier as a flat web or in the form of stripes, the thickness being preferably between 1 and 15 mm.

In the next process step, the mixture is thickened to form a semi-finished product. This is effected by polymer-analogous reactions of the thickener with the end groups of the unsaturated polyester, the viscosity increase being brought about by the increase in molecular weight. Thickening may be effected at room temperature, in which case it generally requires several days. It can be accelerated by raising the temperature to at most 130° C. Preferably, thickening is effected at from 50° to 100° C. for from 2 to 10 minutes. The thickening process results in semi-finished products which can be stored and which, depending on the nature and amount of the thickeners, fillers and reinforcing materials have a pasty, leathery or stiff consistency.

According to the invention, the metal wire is embedded in the molding material either before or after thickening the resin. If carried out before thickening, it is effected by simultaneously impregnating the open or laid wire fabric and the fiber mats with the liquid resin mixture; if effected when the molding material has already been thickened, the wire is placed between two sheets of the semi-finished product. Correspondingly, it is also possible to produce a laminar structure of a plurality of alternating wire layers and layers of semi-finished product.

The shaping of the semi-finished product containing metal wire inserts may be effected two-dimensionally, for example by bending, folding or doming. However, three-dimensional shaping by deep-drawing, embossing, pressing or punching is of greater importance. For these processes, the shaping equipment conventionally used in plastics processing and especially in sheet metal processing may be employed. The important feature is that the shaped semi-finished product no longer changes the three-dimensional shape resulting from the shaping operation, or at least does not do so within a manageable time, say several hours. This allows the shaped semi-finished product to be taken from the shaping equipment, transported, stored and photocured in a subsequent process step, outside the mold. This permits very short cycle times, as are usual in, for example, sheet metal working. Semi-finished tubes with metal wire inserts are flexible and can be bent as desired, and subsequently cured. This is not possible in the case of tubes without wire inserts.

In the next process step, the shaped semi-finished product is cured by irradiation with ultraviolet. Advantageously, ultraviolet radiation sources having a high emission in the long wavelength range (300–450 nm) with the maximum preferably located between 360 and 390 nm, are used for this purpose. Preferably, mercury vapor low pressure lamps with an internal fluorescent coating (fluorescent tubes) or mercury vapor high pressure lamps are used. In some cases even direct sunlight suffices. Application of heat by means of hot air or infrared radiators accelerates the curing.

In some cases it can be advantageous to subject the moldings to a thermal post-curing treatment to lower the residual monomer content. This is particularly advantageous in cases where the mixtures originally contained compounds which form free radicals, ie. peroxides, azo compounds or C—C-labile compounds. The post-curing is advantageously performed at from 80° to 120° C.

The cured moldings produced according to the invention can be used in many sectors of industry, for example as components in automotive, boat and aircraft construction, in domestic appliances, as profile sections, stiffening ribs, pipes, roofing components, flashing round chimneys, ventilation ducts, housings, troughs, screens from electromagnetic waves, and even parabolic aerials, where the metal wire inserts additionally perform the function of an electrical conductor. In the case of articles of large surface area, for example vehicles, the metal grid inserts have the advantage that the material does not shatter upon fracture, but instead is held together by the wires.

We claim:

1. A photopolymerizable, sheet-like molding material containing a mixture of
1. an unsaturated polyester,
2. with or without a copolymerizable vinyl compound,
3. 0.005–0.5% by weight of an inhibitor,
4. 0.01–3% by weight of a photoinitiator,
5. 0.2–5% by weight of a thickening oxide or hydroxide of lithium, magnesium or calcium or of a metal alcoholate or of an isocyanate,
6. 1–50% by weight of an ultraviolet-transmitting pulverulent assistant and/or
7. 5–70% by weight of a fibrous reinforcing material, with or without
8. other conventional additives, the percentages being based on the mixture, and wherein said photopolymerizable, sheet-like molding material has inserted therein shapeable metal wire having a thickness of 0.1 to 3 mm, with said wire being present in an amout of from 10 to 500 parts by weight per 100 parts by weight of said mixture.

2. A molding material as claimed in claim 1, wherein the metal wire is present unidimensionally in the form of parallel wires or of a helix or two-dimensionally in the form of laid webs or of woven or welded grids.

3. A process for producing reinforced polyester moldings comprising the sequential steps of:
(A) preparing a homogeneous mixture which contains
1. an unsaturated polyester,
2. with or without a copolymerizable vinyl compound,
3. 0.005–0.5% by weight of an inhibitor,
4. 0.01–3% by weight of a photoiniator,
5. 0.2–5% by weight of a thickening oxide or hydroxide of lithium, magnesium or calcium or of a metal alcoholate or of an isocyanate,
6. 1–50% by weight of an ultraviolet-transmitting pulverulent assistant and/or
7. 5–70% by weight of a fibrous reinforcing material, with or without
8. other conventional additives, the percentages being based on the total weight of the mixture,
(B) embedding shapeable metal wires each having a thickness of from 0.1 to 3 mm within said mixture in an amount of from 50 to 200 parts by weight of metal wire per 100 parts by weight of the mixture of components 1 to 8,
(C) thickening the mixture to form a semi-finished product, and
(D) curing said semi-finished product by ultra-violet irradiation.

4. A process according to claim 5, wherein said shapeable metal wire is embedded in the semi-finished product obtained in step (C) and before the shaping operation of step (D).

5. A process in accordance with claim 5, wherein the homogeneous mixture obtained in step (A) is applied to a sheet-like carrier before further processing.

6. A process as claimed in claim 5, wherein the semi-finished product is shaped by deep-drawing, embossing, pressing or punching in a mold and the shaped semi-finished product is cured outside the mold.

* * * * *

UNITED STATES PATENT AND TRADEMARK OFFICE
CERTIFICATE OF CORRECTION

PATENT NO. : 4,822,665

DATED : April 18, 1989

INVENTOR(S) : SCHOLZ et al.

It is certified that error appears in the above-identified patent and that said Letters Patent is hereby corrected as shown below:

On the title page Insert

(30) Foreign Application Priority Data

Feb. 21, 1986  Fed. Rep. of Germany . . . 3605574

IN THE CLAIMS

Claim 4, Line 1:

"A process according to claim 5,"

Should Read:

" A process according to claim 3,"

Claim 5, Line 1:
    "in accordance with claim 5,"
Should Read:
    "in accordance with claim 3,"

UNITED STATES PATENT AND TRADEMARK OFFICE
CERTIFICATE OF CORRECTION

PATENT NO. : 4,822,665

DATED : April 18, 1989

INVENTOR(S) : SCHOLZ et al

It is certified that error appears in the above-identified patent and that said Letters Patent is hereby corrected as shown below:

Claim 6, Line 1:
    "A process as claimed in claim 5,"
Should read:
    "A process as claimed in claim 3,"

Signed and Sealed this

Thirtieth Day of January, 1990

*Attest:*

JEFFREY M. SAMUELS

*Attesting Officer*     *Acting Commissioner of Patents and Trademarks*